United States Patent
Guo et al.

(10) Patent No.: US 8,559,738 B2
(45) Date of Patent: Oct. 15, 2013

(54) PREDICTIVE CODING METHOD FOR CODING TEXTURE OF IMAGE

(75) Inventors: Jiun-In Guo, Chia-Yi (TW); Ching-Lung Su, Yunlin County (TW); Jeng-Wei Liao, Chiayi County (TW)

(73) Assignee: National Chung Cheng University, Chiayi County (TW)

( * ) Notice: Subject to any disclaimer, the term of this patent is extended or adjusted under 35 U.S.C. 154(b) by 37 days.

(21) Appl. No.: 13/415,064

(22) Filed: Mar. 8, 2012

(65) Prior Publication Data

US 2012/0294545 A1   Nov. 22, 2012

(30) Foreign Application Priority Data

May 19, 2011 (TW) .............................. 100117554 A (51) Int. Cl.
*G06K 9/36* (2006.01)
(52) U.S. Cl.
USPC ........... 382/238; 382/232; 382/233; 382/250; 382/251
(58) Field of Classification Search
USPC .................... 382/238, 232, 233, 250, 251; 348/394.1, 413.1, 409.1, 415.1, 416.1; 358/426.01, 426.02, 426.03, 426.07, 358/426.08

See application file for complete search history.

(56) References Cited

U.S. PATENT DOCUMENTS

| | | | |
|---|---|---|---|
| 7,236,524 B2 * | 6/2007 | Sun et al. .................. | 375/240.12 |
| 7,881,386 B2 * | 2/2011 | Liang et al. .............. | 375/240.24 |
| 7,936,820 B2 * | 5/2011 | Watanabe et al. ........ | 375/240.16 |
| 8,204,321 B2 * | 6/2012 | Rossato et al. ................ | 382/238 |
| 8,325,804 B2 * | 12/2012 | Haddad et al. ........... | 375/240.12 |

* cited by examiner

*Primary Examiner* — Ali Bayat
(74) *Attorney, Agent, or Firm* — Rosenberg, Klein & Lee (57) ABSTRACT

A predictive coding method for coding intra of frames is revealed. Firstly, an encoder divides an image frame into a plurality of macroblocks. Then the encoder sets predictive coding models corresponding to these macroblocks according to a ratio. The encoder performs predictive coding for coding each macroblock according to the corresponding predictive coding model so as to get and output a coded image. By the present invention, various predictive coding models are set and applied to code the different macroblocks so as to increase predictive coding efficiency. The intra prediction efficiency and image compression efficiency are improved simultaneously.

11 Claims, 7 Drawing Sheets

PREDICTIVE CODING METHOD FOR CODING TEXTURE OF IMAGE

BACKGROUND OF THE INVENTION

1. Fields of the Invention

The present invention relates to an image processing method, especially to a predictive coding method for coding texture features of images.

2. Descriptions of Related Art

Due to the improved coding efficiency of video compression standards, the video compression standards have been applied to various fields such as video telephony, video conferencing, video streaming, etc. Generally, the video coding technology involved in these applications such as H.264, a standard for video compression, consists of various techniques such as discrete cosine transform (DCT), motion estimation (ME), motion compensation (MC), quantization (Q), variable length coding (VLC), etc. In the quantization process, quantization parameter (QP) corresponding to quantization step—size is an adaptive and important coding parameter, having great effects on the quality of the coded video. Among the image compression techniques available now, the texture prediction is used for intra frame prediction. Moreover, for an image coding technique using adaptive bandwidth control, a predictive coding model is selected. By using texture data already coded in low resolution images as reference, following texture is predictable. There are two predictive coding models representing texture, including 16×16 intra prediction mode and 4×4 intra prediction mode. Thus the coding efficiency is improved and residue bits of the coding image are reduced.

In the 16×16 intra prediction mode, a macroblock includes 16×16 blocks. The intra 16×16 supports four prediction modes, Mode 0-vertical mode, Mode 1-horizontal mode, Mode 2-direct current (DC) mode, and Mode 3-plane mode. When the block sizes of the macroblock is 4×4(intra 4×4), the prediction modes is composed of 9 types, Mode 0-vertical mode, Mode 1-horizontal mode, Mode 2-direct current (DC) mode, Mode 3-diagonal-down-left mode, Mode 4-diagonal-down-right mode, Mode 5-vertical-right mode, Mode 6-horizontal-down mode, Mode 7-vertical-left mode, and Mode 8-horizontal-up mode. However, while the above image compression techniques available now is used for coding the high-resolution images such as HD (high definition image) or full HD images, the computation complexity also increases along with the higher image quality.

Thus there is a need to provide a predictive coding method for coding texture features of images that uses neighboring macroblocks and distribution of macroblocks of low-resolution images as references for prediction. Moreover, a ratio between different predictive modes used in a single image frame can be set so as to improve image quality.

SUMMARY OF THE INVENTION

Therefore it is a primary object of the present invention to provide a predictive coding method for coding texture of images that uses neighboring macroblocks and distribution of macroblocks of low-resolution image as references for providing fast prediction.

It is another object of the present invention to provide a predictive coding method for coding texture of images that improves image quality by setting different ratio between various predictive coding models.

In order to achieve the above objects, a predictive coding method for coding texture features of images according to the present invention includes a plurality of steps. Firstly, divide an image frame into a plurality of macroblocks by an encoder. The macroblocks are set as a plurality of first macroblocks and a plurality of second macroblocks by the encoder according to a ratio between a fast intra-prediction mode and a full search mode. A setting information is generated. The first macroblocks are corresponding to the fast intra-prediction mode while the second macroblocks are corresponding to the full search mode. According to the setting information, the encoder detects and selects the fast intra-prediction mode or the full search mode for predictive coding of the first macroblocks and the second macroblocks.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
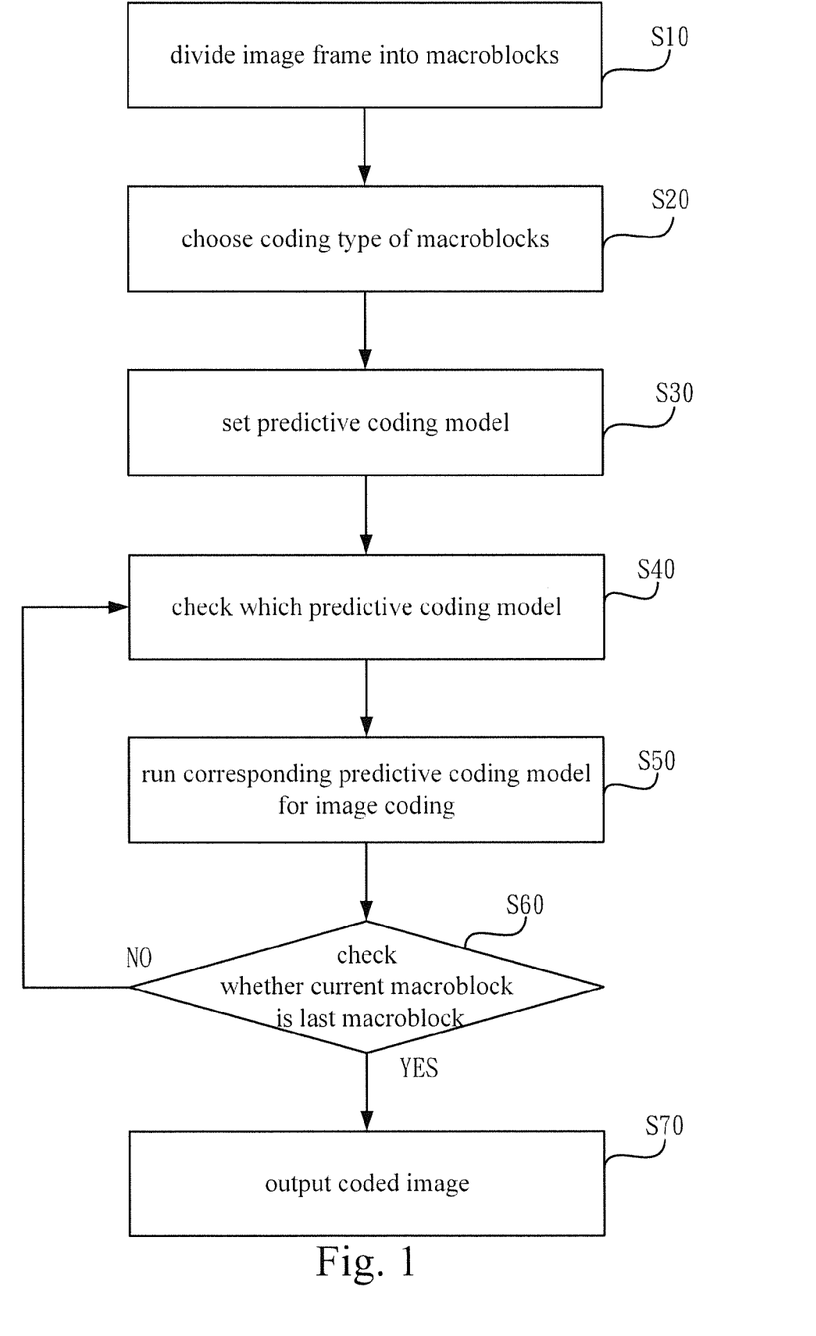
FIG. 1 is a flow chart of an embodiment according to the present invention.

Refer to FIG. 1, a flow chart of an embodiment according to the present invention is revealed. A predictive coding method for coding texture of images of the present invention uses an encoder for predictive coding of an image frame so as to reduce computation and improve video compression rate.

The predictive coding method for coding texture of images according to the present invention includes following steps:

S10: divide an image frame into a plurality of macroblocks;
S20: choose a coding type of the macroblocks;
S30: set a predictive coding model by which the macroblock is coded so as to generate a setting information;
S40: check which predictive coding model is going to be executed next according to the setting information;
S50: run a corresponding predictive coding model for image coding;
S60: check whether the current macroblock is the last macroblock;
S70: output a coded image.

Figure 2:
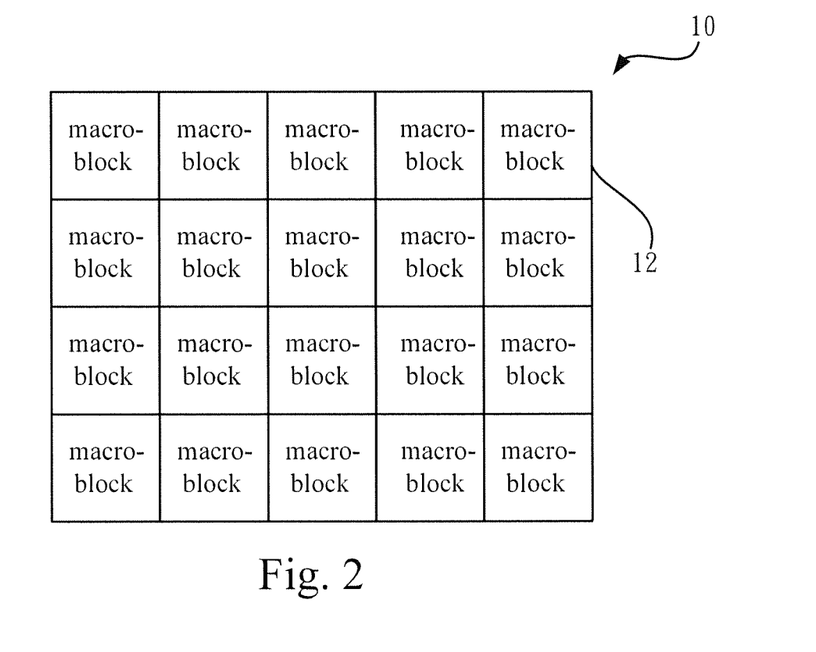
FIG. 2 is a schematic drawing showing an image frame of an embodiment according to the present invention; schematic drawing showing a first macroblock of an embodiment according to the present invention.
Figure 3A:
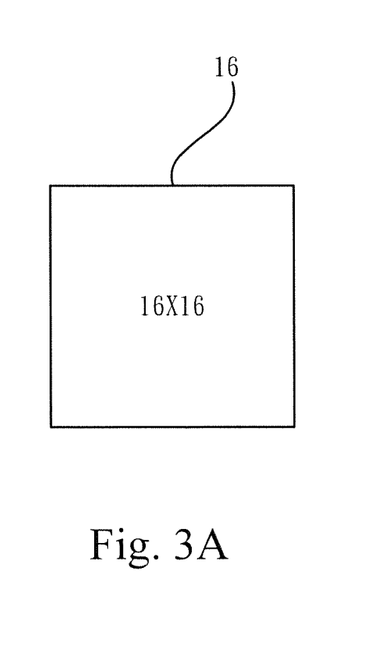
FIG. 3A is a schematic drawing showing a first macroblock of an embodiment according to the present invention.
Figure 3B:
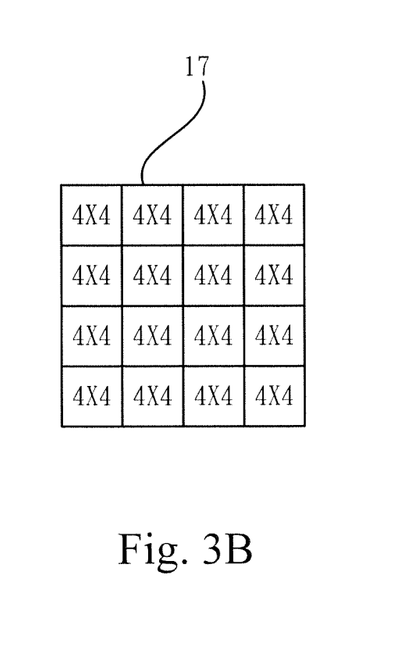
FIG. 3B is a schematic drawing showing a second macroblock of an embodiment according to the present invention.

In the step S10, as shown in FIG. 2, divide an image frame 10 into a plurality of macroblocks 12 by an encoder (not shown in figure). The encoder cuts the image frame 10 according to a length-to-width ratio of the image frame 10 so that each macroblock 12 has the same number of pixels. For example, the image frame 10 in this embodiment is of size 80 pixels×64 pixels. Based on a block size of 16×16 pixels, the image frame 10 is divided into 20 macroblocks 12. In the step S20, the encoder sets these macroblocks 12 as first macroblock or second macroblock according to image complexity. Refer FIG. 3A, the first macroblock is a 16×16 macroblock 16 in size. The second coded macroblock is a plurality of 4×4 macroblocks 17. For images with low complexity, the 16×16 macroblock 16 (macroblocks of size 16×16) is used so as to reduce computation load during the image coding process. While coding the images with high complexity, use 4×4 macroblocks 17 so as to improve the image quality and predict the image texture more accurately.

Figure 4:
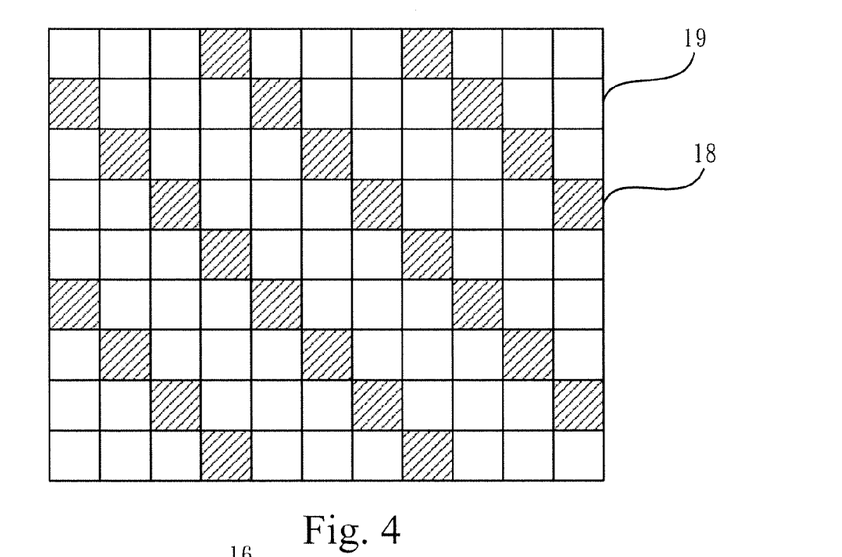
FIG. 4 is a schematic drawing showing a predictive coding model of an embodiment according to the present invention.

In the step S30, according to a ratio of a fast intra-prediction mode to a full search mode based on checking different prediction modes for each macroblock, the predictive coding model for coding each macroblock of the image frame 10 is set by the encoder so as to control the predictive coding model that codes the macroblocks and improve the accuracy. According to this ratio, the full search mode is applied to part of macroblocks while the fast intra prediction mode is applied to the rest part of macroblocks. As shown in FIG. 4, a first macroblock 18 is a macroblock coded by the full search mode and a second macroblock 19 is a macroblock processed by the fast intra prediction. The ratio of the first macroblock 18 to the second macroblock 19 is 1:3. That means each set of macroblocks includes one first macroblock 18 and three second macroblocks 19. Thereby coding errors of the fast intra prediction mode are corrected by the full search mode for the first macroblock 18. At the same time, the computation is reduced by the fast intra prediction mode for the second macroblock 19. Next the encoder generates a setting information according to settings of prediction modes for the macroblocks of the image frame 10. Moreover, the ratio in this embodiment can be adjusted according to image complexity. For example, in HD images, Full HD images, or D1 resolution images, the ratio is adjusted to 2:3 so as to increase image quality and accuracy.

Figure 5A:
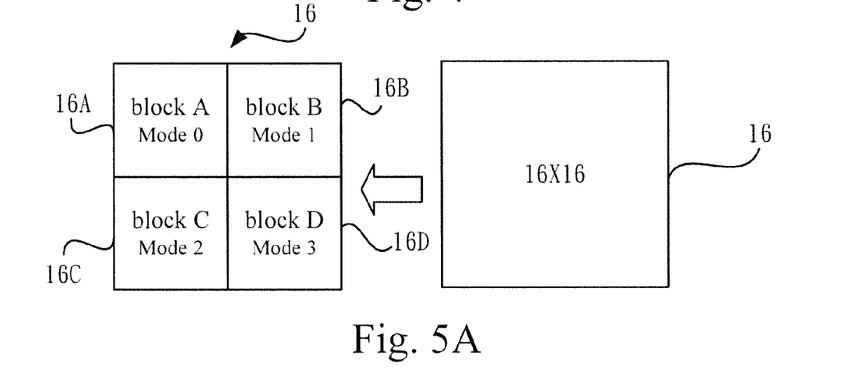
FIG. 5A is a schematic drawing showing image prediction of an embodiment according to the present invention.
Figure 5B:
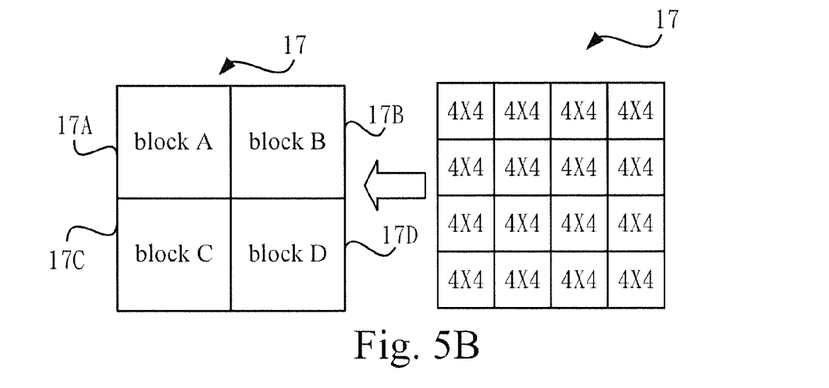
FIG. 5B is a schematic drawing showing image prediction of an embodiment according to the present invention.

Refer to the step S40 and FIG. 5A, in this embodiment, the 16×16 macroblock 16 is used when the encoder receives images with low complexity. An image of size 48×32 is taken as an example. The encoder divides the image into four blocks, block A 16A, block B 16B, block C 16C, and block D 16D, respectively coded with the vertical mode (Mode 0), the horizontal mode (Mode 1), the DC mode (Mode 2), and the plane mode (Mode 3) shown in FIG. 7B. That means the vertical mode is used to code the block A 16A by the encoder, the horizontal mode is used to code the block B 16B by the encoder, the DC mode is used to code the block C 16C by the encoder, and the plane mode is used to code the block D 16D by the encoder. Refer to FIG. 5B, in this embodiment, the 4×4 macroblocks are used when the encoder receives images with low complexity. An image of size 48×32 is taken as an example. The encoder divides the image into four blocks, block A 17A, block B 17B, block C 17C, and block D 17D. The vertical mode (Mode 0), the vertical-right mode (Mode 5), and vertical-left mode (Mode 7) are executed in the block A 17A. The horizontal mode (Mode 1), the diagonal-down-right mode (Mode 4), and the horizontal-down mode (Mode 6) are executed in the block B 17B, the DC mode (Mode 2) is executed in the block C 17C, the diagonal-down-left mode (Mode 3), and the horizontal-up mode (Mode 8) are executed in the block D 17D, as shown in the FIG. 8B. Furthermore, according to the results of the prediction coding for the 4×4 macroblocks, the DC mode is executed in accordance with the highest result of the prediction coding on the block A17A, the block B 17B, the block C 17C, and the block D 17D. Thus the results of the prediction coding similar to the 16×16 macroblock are obtained by the encoder. Moreover, when the 16×16 macroblocks are used, the vertical mode is executed in the block A 17A by the encoder, the horizontal mode is executed in the block B 17B by the encoder, the DC mode is executed in the block C 17C by the encoder, and the plane mode is executed in the block D 17D by the encoder, similar to the block A 16A, the block B 16B, the block C 16C and the block D 16D shown in the FIG. 5A.

Figure 6A:
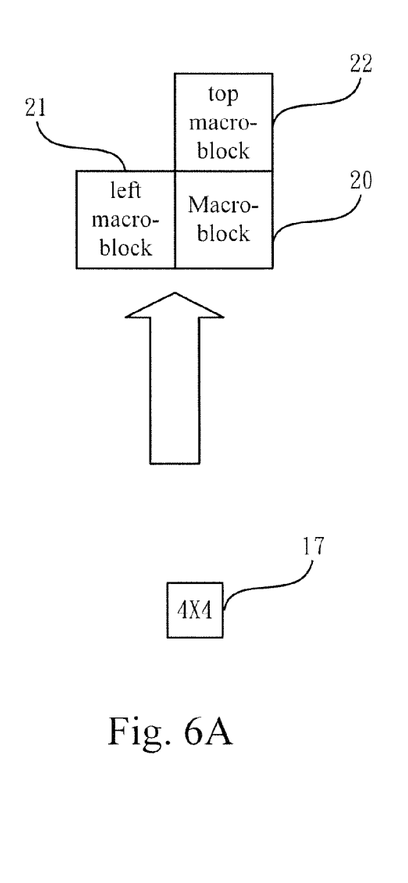
FIG. 6A is a schematic drawing showing a first image prediction process of an embodiment according to the present invention.
Figure 6B:
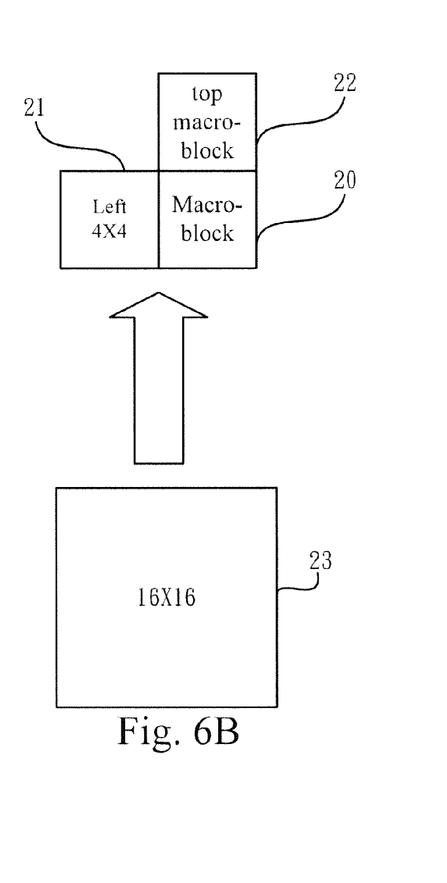
FIG. 6B is a schematic drawing showing a second image prediction process of an embodiment according to the present invention.

Refer to FIG. 6A and FIG. 6B, in a 4×4 macroblock 20 for texture prediction with high complexity, besides coding results of the predictive coding model and the DC mode for a left macroblock 21 coded and for a top macroblock 22 coded, the predictive coding model for images with low resolution is also used as a reference for predictive coding of the macroblock 20. The 4×4 macroblock 23 shown in FIG. 6A or the macroblock 16 shown in FIG. 6B is a block with low-resolution, corresponding to the macroblock 20.

Figure 7A:
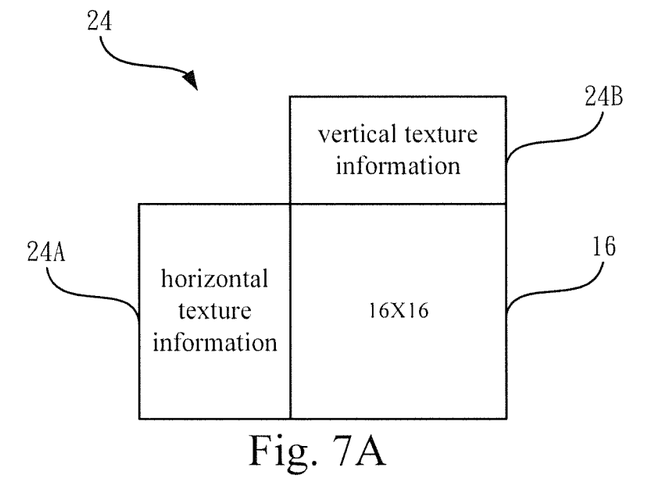
FIG. 7A is a schematic drawing showing a first predictive coding model of an embodiment according to the present invention.
Figure 7B:
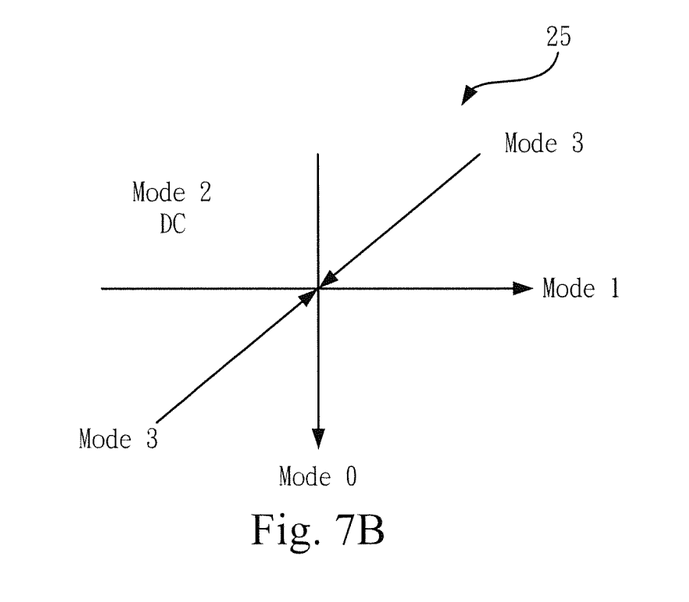
FIG. 7B is another schematic drawing showing a first predictive coding model of an embodiment according to the present invention.
Figure 8A:
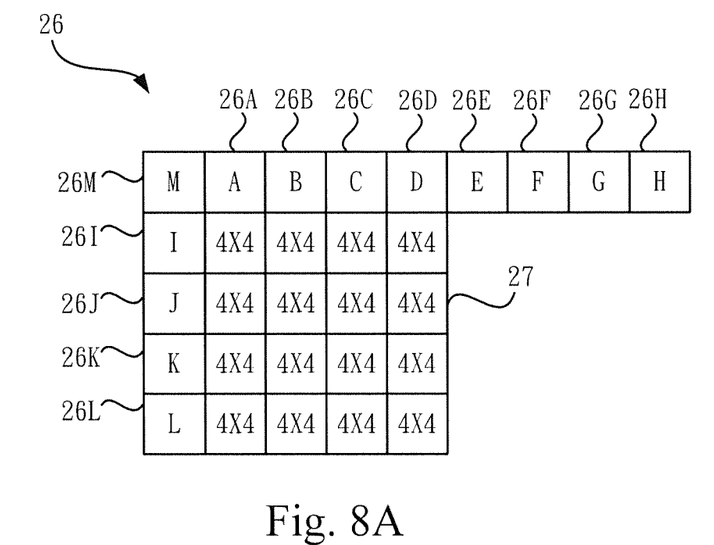
FIG. 8A is a schematic drawing showing a second predictive coding model of an embodiment according to the present invention.
Figure 8B:
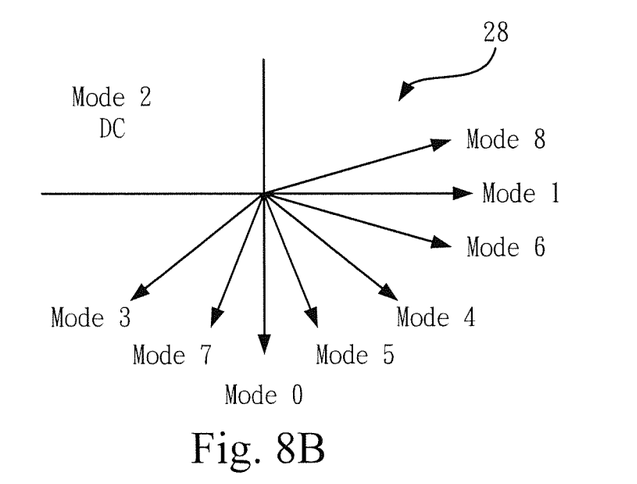
FIG. 8B is another schematic drawing showing a second predictive coding model of an embodiment according to the present invention.

In the step S50, when an encoder performs the predictive coding on the 16×16 macroblock, the texture configuration is shown in FIG. 7A and the direction of the predictive coding is shown in FIG. 7B. When the encoder performs the predictive coding for coding the 4×4 macroblock, the texture configuration is shown in FIG. 8A and the direction of the predictive coding is shown in FIG. 8B. In the step S60, the encoder checks whether the current macroblock predicted is the last one. If the answer is yes, the encoder continues to run the step S70. If not, the encoder takes the step S40, check the predictive coding model of the next macroblock. In the step S70, a coded image is output by the encoder.

Through the above steps from S10 to the step S70 of the present invention, the computation complexity is reduced dramatically, especially when the fast prediction mode is executed by the encoder. The total computation is reduced more than 50%, ranging from 52.93% to 69.60%. In accordance with a predictive coding method including adaptive switching predictive mode of the present invention, the quality degradation of Full HD images is less than 0.02 dB. The quality degradation of HD images is less than 0.006 dB. The quality degradation of D1 resolution images is less than 0.025 dB.

Refer to FIG. 7A and FIG. 7B, a first predictive coding model of an embodiment according to the present invention is revealed. As shown in the FIG. 7A, texture information 24 of the macroblock 16 includes a horizontal texture information 24A and a vertical texture information 24B. Refer to FIG. 7B, while the encoder using the predictive coding for coding the 16×16 macroblock 16 according to the horizontal texture information 24A and the vertical texture information 24B, the direction of the predictive coding 25 of the encoder refers to the vertical mode, the horizontal mode, the DC mode, and the plane mode. In the vertical mode, the encoder performs the predictive coding according to the vertical texture information 24B and the coding direction is vertical. In the horizontal mode, the encoder performs the predictive coding according to the horizontal texture information 24A and the horizontal direction of the predictive coding is present. In the DC mode, the encoder runs the predictive coding according to both the horizontal texture information 24A and the vertical texture information 24B while the direction of predictive coding is perpendicular to both vertical and horizontal directions. In the plane mode, encoder runs the predictive coding according to both the horizontal texture information 24A and the vertical texture information 24B. The predictive coding is performed along a direction toward the reference position of the horizontal texture information 24A and along a direction toward the reference position of the vertical texture information 24B by the encoder. The directions of prediction mode are inclined and opposite to each other.

Refer to FIG. 8A and FIG. 8B, a second predictive coding model of an embodiment according to the present invention is revealed. As shown in the FIG. 8A, texture information 26 of a macroblock 27 includes a first texture information 26A, a second texture information 26B, a third texture information 26C, a fourth texture information 26D, a fifth texture information 26E, a sixth texture information 26F, a seventh texture information 26G, an eighth texture information 26H, a ninth texture information 26I, a tenth texture information 26J, an eleventh texture information 26K, a twelfth texture information 26L, a thirteenth texture information 26M. Refer to FIG. 8B, while the encoder using the predictive coding for coding the macroblock 27 according to the first texture information 26A, the second texture information 26B, the third texture information 26C, the fourth texture information 26D, the fifth texture information 26E, the sixth texture information 26F, the seventh texture information 26G, the eighth texture information 26H, the ninth texture information 26I, the tenth texture information 26J, the eleventh texture information 26K, the twelfth texture information 26L, and the thirteenth texture information 26M, the encoder determines the direction of the predictive coding 28 with reference of the vertical mode, the horizontal mode, the DC mode, the diagonal-down-left mode, the diagonal-down-right mode, the vertical-right mode, the horizontal-down mode, the vertical-left mode, and the horizontal-up mode.

In the vertical mode, the encoder performs the predictive coding according to the first texture information 26A, the second texture information 26B, the third texture information 26C, and the fourth texture information 26D. The coding direction is vertical. In the horizontal mode, the encoder performs the predictive coding according to the ninth texture information 26I, the tenth texture information 26J, the eleventh texture information 26K, and the twelfth texture information 26L. The coding direction is horizontal. In the DC mode, the encoder performs the predictive coding according to the first texture information 26A, the second texture information 26B, the third texture information 26C, the fourth texture information 26D, the ninth texture information 26I, the tenth texture information 26J, the eleventh texture information 26K, and the twelfth texture information 26L at the same time. The coding is predicted along both the horizontal direction and the vertical direction simultaneously. The coding direction is perpendicular to vertical and horizontal directions.

Moreover, in the diagonal-down-left mode, the encoder performs the predictive coding according to the first texture information 26A, the second texture information 26B, the third texture information 26C, the fourth texture information 26D, the fifth texture information 26E, the sixth texture information 26F, the seventh texture information 26G, and the eighth texture information 26H. The coding is predicted along the diagonal down left direction. In the diagonal-down-right mode, the encoder performs the predictive coding according to the first texture information 26A, the second texture information 26B, the third texture information 26C, the fourth texture information 26D, the ninth texture information 26I, the tenth texture information 26J, the eleventh texture information 26K, the twelfth texture information 26L, and the thirteenth texture information 26M. The coding direction is the diagonal down right direction. In the vertical-right mode, the encoder performs the predictive coding according to the first texture information 26A, the second texture information 26B, the third texture information 26C, the fourth texture information 26D, the ninth texture information 26I, the tenth texture information 26J, the eleventh texture information 26K, the twelfth texture information 26L, and the thirteenth texture information 26M. The coding is predicted almost vertically, slightly inclined to the right.

Furthermore, n the horizontal-down mode, the encoder performs the predictive coding according to the ninth texture information 26I, the tenth texture information 26J, the eleventh texture information 26K, the twelfth texture information 26L, and the thirteenth texture information 26M. The coding direction is inclined downward from the horizontal direction. In the vertical-left mode, the encoder performs the predictive coding according to the first texture information 26A, the second texture information 26B, the third texture information 26C, the fourth texture information 26D, the fifth texture information 26E, the sixth texture information 26F, the seventh texture information 26G, and the eighth texture information 26H. The coding prediction is inclined to left from the vertical direction. In the horizontal-up mode, the encoder performs the predictive coding according to the ninth texture information 26I, the tenth texture information 26J, the eleventh texture information 26K, the twelfth texture information 26L, and the thirteenth texture information 26M. The coding is predicted along a direction inclined a bit above the horizontal direction.

In addition, according to the predictive coding method of the present invention, the same image is coded by an encoder using different predictive coding models under control of the ratio between models. Thus the coding efficiency is improved. The ratio is also adjusted according to the complexity of images so that the method can be applied to images with various complexities. Therefore, high coding performance and high compression efficiency are achieved.

Figure 9:
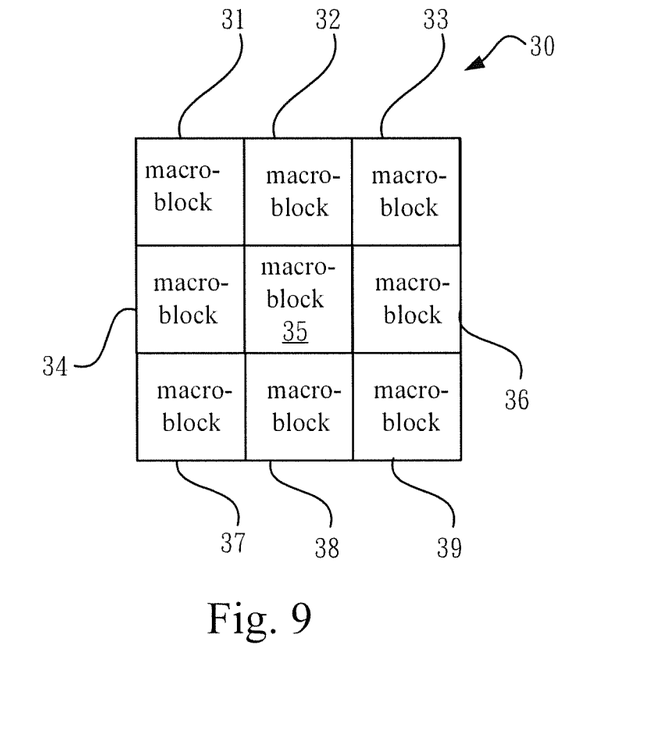
FIG. 9 is a schematic drawing showing another embodiment of the present invention.

Refer to FIG. 9, another embodiment of the present invention is revealed. As shown in the figure, the encoder divides the image frame into a plurality of macroblocks. Next the predictive coding is performed for each macroblock. In this embodiment, macroblocks 31, 32, 33, 34, 35, 36, 37, 38, 39 are used as an example. The macroblock 35 is the macroblock being predicted and coded by the encoder currently. The macroblocks 31, 32, 33, 34 are macroblocks already been coded. When the encoder executes a fast prediction mode for coding the macroblock 35, the encoder uses the predictive coding results of the macroblocks 31, 32, 33, 34 and the predictive coding result of the DC mode of the macroblock 35 for predictive coding. When the encoder executes the full search mode, the encoder switches the prediction models according to the coding types of the macroblocks. For 16×16 macroblocks, the encoder performs the predictive coding according to the coding directions shown in FIG. 7A and FIG. 7B. For 4×4 macroblocks, the encoder predicts the coding according to the directions shown in FIG. 8A and FIG. 8B.

After the encoder completing the predictive coding of the last macroblock, a coded image is output.

In the present invention, the encoder switches the prediction models according to coding types of macroblocks so as to perform predictive coding of texture on each macroblock. By the present invention, the encoder switches to the fast prediction mode so that the computation is reduced. Less data amount is used for predictive coding of image texture. Moreover, full search mode based on checking different prediction modes for each macroblock can be applied to compensate errors generated by the encoder under the fast prediction mode. Thus the distortion of the coded images is reduced and the image quality after being coded is improved.

In summary, a predictive coding method for coding intra of frames of the present invention that divides an image frame into a plurality of macroblocks and sets a ratio parameter of different predictive coding models such as full search and fast intra-prediction mode corresponding to the macroblocks so as to get optimal intra prediction of images and outputs the coded images. Moreover, in the present invention, the encoder predicts upon references from neighboring macroblocks according to the fast intra-prediction mode so as to increase predictive coding efficiency and further improve image compression efficiency.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A predictive coding method for coding texture of images comprising the steps of:
   dividing an image frame into a plurality of macroblock by an encoder and the image frame corresponding to at least one texture; setting the macroblocks as a plurality of first macroblocks and a plurality of second macroblocks by the encoder according to a ratio between a fast intra-prediction mode and a full search mode; a setting information is generated; the first macroblocks are corresponding to the fast intra-prediction mode while the second macroblocks are corresponding to the full search mod; the setting information representing distribution of the first macroblocks and the second macroblocks; and
   detecting and using the fast intra-prediction mode or the full search mode for predictive coding of the first macroblocks and the second macroblocks by the encoder according to the setting information; wherein when the encoder uses the fast intra-prediction mode for predictive coding of the first macroblocks, predictive coding is performed in accordance with neighboring macroblocks of the first macroblocks by the encoder; when the encoder uses the full search mode for predictive coding of the second macroblocks, predictive coding is performed in accordance with different prediction modes for the second macroblocks by the encoder.

2. The method as claimed in claim 1, wherein after the step of dividing an image frame into a plurality of macroblock by an encoder, the method further comprising a step of:
   coding the macroblocks by 4×4 intra prediction mode, 16×16 intra prediction mode or their combinations according to complexity of the image frame by the encoder.

3. The method as claimed in claim 1, wherein the method further comprising a step of:
   checking whether the macroblock currently coded by the encoder is the last macroblock; the encoder outputs a coded image if the answer is yes; the encoder continues coding next macroblock if the answer is no.

4. The method as claimed in claim 1, wherein in the step of performing predictive coding in accordance with neighboring macroblocks of the first macroblocks by the encoder, the encoder performs predictive coding according to predictive coding results in a DC mode of the first macroblocks and neighboring macroblocks of the first macroblocks already coded when each first macroblock is coded as a 16×16 area.

5. The method as claimed in claim 1, wherein in the step of performing predictive coding in accordance with neighboring macroblocks of the first macroblocks by the encoder, the encoder performs predictive coding according to predictive coding results in a DC mode of the first macroblocks and neighboring macroblocks of each first macroblock already coded when the each macroblock is 4×4 in size.

6. The method as claimed in claim 1, wherein in the step of performing predictive coding in accordance with different prediction modes for the second macroblocks by the encoder, when the second macroblock is a macroblock in size of 4×4, the 4×4 macroblock is divided into a first block, a second block, a third block and a fourth block by the encoder; a vertical mode, a vertical-right mode and a vertical-left mode are applied to the first block by the encoder; a horizontal mode, a diagonal-down-right mode, and a horizontal-down mode are applied to the second block by the encoder; a direct current mode is applied to the third block by the encoder; a diagonal-down-left mode and a horizontal-up mode are applied to the fourth block by the encoder.

7. The method as claimed in claim 1, wherein in the step of performing predictive coding in accordance with different prediction modes for the second macroblocks by the encoder, when the second macroblock is a macroblock in size of 4×4, the 4×4 macroblock is divided into a first block, a second block, a third block and a fourth block by the encoder; then a direct current mode is executed in accordance with the highest result of the prediction coding on the first bloc, the second block, the third block and the fourth block.

8. The method as claimed in claim 1, wherein in the step of performing predictive coding in accordance with different prediction modes for the second macroblocks by the encoder, when the second macroblock is a macroblock in size of 4×4 and the prediction coding mode is the full search mode, the encoder performs predictive coding according to a vertical mode, a horizontal mode, a direct current mode, a diagonal-down-left mode, a diagonal-down-right mode, a vertical-right mode, a horizontal-down mode, a vertical-left mode, and a horizontal-up mode.

9. The method as claimed in claim 1, wherein in the step of performing predictive coding in accordance with different prediction modes for the second macroblocks by the encoder, when the second macroblock is a macroblock in size of 16×16, the 16×16 macroblock is divided into a first block, a second block, a third block and a fourth block by the encoder; a vertical mode is used in the first block by the encoder; a horizontal mode is used in the second block by the encoder; a direct current is used in the third block by the encoder; a plane mode is used in the fourth block by the encoder.

10. The method as claimed in claim 1, wherein in the step of performing predictive coding in accordance with different prediction modes for the current macroblock by the encoder, when the current macroblock is a macroblock in size of 16×16 and the prediction coding mode is the full search mode, the encoder performs predictive coding according to a vertical mode, a horizontal mode, a direct current mode, a plane mode or their combinations.

11. A predictive coding method for intra of frame comprising the steps of:
- dividing an image frame into a plurality of macroblock by an encoder and the image frame corresponding to at least one texture; setting the macroblocks as a plurality of first macroblocks and a plurality of second macroblocks by the encoder according to a ratio between a fast intra-prediction mode and a full search mode; a setting information is generated; the first macroblocks are corresponding to the fast intra-prediction mode while the second macroblocks are corresponding to the full search mode; the setting information representing distribution of the first macroblocks and the second macroblocks;
- detecting and using the fast intra-prediction mode or the full search mode for predictive coding of the first macroblocks and the second macroblocks by the encoder according to the setting information; and
- outputting a coded intra data by the encoder;
- wherein the encoder performs predictive coding according to a reference block of the first macroblock when the encoder uses the fast intra-prediction mode for predictive coding of the first macroblocks; the resolution (720× 486) of the reference block of the first macroblock is lower than a resolution (720×486) of D1 format.

* * * * *